United States Patent
Paine et al.

[15] 3,669,393
[45] June 13, 1972

[54] ADJUSTABLE SUPPORT

[72] Inventors: Thomas O. Paine, Administrator of the National Aeronautics and Space Administration with respect to an invention of; Thomas W. Andrews, 2029 North Grand Oaks, Altadena, Calif. 91001

[22] Filed: July 31, 1970
[21] Appl. No.: 59,968

[52] U.S. Cl. .................................................. 248/188.4
[51] Int. Cl. ........................................................ F16m 13/02
[58] Field of Search ................... 248/16, 23, 25, 188.4, 404, 248/405, 125

[56] References Cited

UNITED STATES PATENTS 1,182,861  5/1916  Spencer ........................... 248/23 UX
1,321,081  11/1919  Behn ................................ 248/23 X

FOREIGN PATENTS OR APPLICATIONS 1,162,866  8/1969  Great Britain .................... 248/188.4

Primary Examiner—William H. Schultz
Attorney—J. H. Warden, Paul F. McCaul and John R. Manning

[57] ABSTRACT

An adjustable support by which the distance at which a member is supported with respect to a base may be altered, is readily accessible for adjustment at a point remote from the supported member with respect to the base, and includes a junction with the supported member which is capable of limited universal movement to accommodate misalignment of the supported member with respect to the base.

2 Claims, 3 Drawing Figures

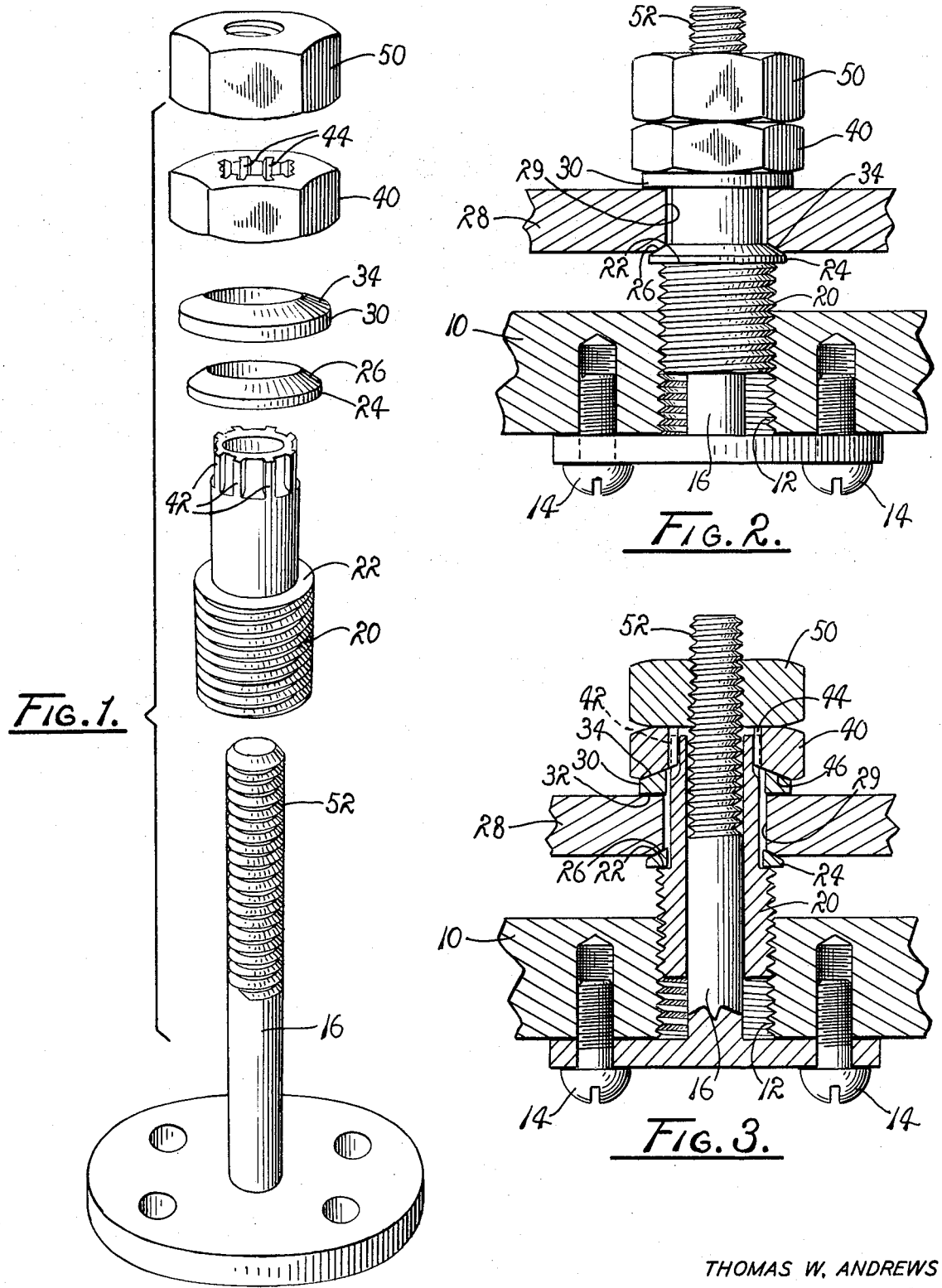

ADJUSTABLE SUPPORT

ORIGIN OF THE INVENTION

The invention described herein was made in the performance of work under a NASA contract and is subject to the provisions of Section 305 of the National Aeronautics and Space Act of 1958, Public Law 85-568(72 stat. 435; 42 U.S.C. 2457).

BACKGROUND OF THE INVENTION

1. Field of the Invention

The invention relates generally to devices for adjustably supporting a member with respect to a base, as, for instance, in applications requiring leveling of a table, instrument support or the like, or applications involving alignment of assemblies such as winding and reeling assemblies for films and tapes.

2. Description of the Prior Art

A wide variety of adjustable supports for leveling or positioning relatively movable portions of tables and the like, such as illustrated in the U.S. Pat. to Butler, No. 2,403,338; Attermeyer, U.S. Pat. No. 3,356,324; and Brotherton, U.S. Pat. No. 155,635 have been developed, but none has supplied the need for a device combining the capability of effecting a positive adjustment and locking the device, easy accessibility for readjustment, and permitting limited universal movement of the supported member with respect to its base.

OBJECTS AND SUMMARY OF THE INVENTION

It is the principal object of the present invention to provide an adjustable support which is easily accessible for altering its adjustment yet capable of being set and firmly locked in the given adjustment, and which is particularly adapted for applications in which it is employed for leveling a planar member with respect to a base which itself may not be level. In such applications it is necessary, in order to avoid stressing the adjustable support in such a way as to render its readjustment difficult or impossible, to provide for limited tilting movement of the supported member with respect to the base.

The device of the present invention accomplishes this object essentially by providing a configuration including an adjustable jacking screw by which the separation between the base and the supported member may be varied, together with means for locking the jacking screw in any adjusted position and a connection between the jacking screw and the supported member, permitting limited universal tilting movement of the supported member with respect to the jacking screw.

The foregoing, together with other objects and advantages of the invention, will be more readily apparent upon reference to the following description and claims, when viewed together with the accompanying drawing.

BRIEF DESCRIPTION OF THE DRAWING

FIG. 1 is an exploded view in perspective of elements of the device of the present invention other than the base provided with an internally threaded opening for reception of the jacking screw;

FIG. 2 is a view in side elevation of the assembled device of the present invention in conjunction with a base illustrated in section and having an internally threaded opening and a supported member also illustrated in section; and FIG. 3 is a view in vertical section of the assembled device of the present invention, together with a base and supported member.

DESCRIPTION OF THE PREFERRED EMBODIMENT

As shown in the accompanying drawing, the device of the present invention comprises a base 10 having an internally threaded opening 12 to which base there is secured, by means such as screws 14, a post 16 which is disposed concentrically with respect to the opening 12 and serves as a guide for an externally threaded jacking sleeve 20 surrounding the post 16 and threaded into the opening 12.

Means are provided for supporting on the jacking sleeve 20 a member to be variably positioned with respect to the base. This means comprises a shoulder 22 intermediate the ends of the jacking sleeve 20 with which a first washer 24 is engageable. The surface of the washer 24 opposite that contacting the shoulder 22 in the assembly of the device presents a spherically curved surface 26 upon which the member to be supported, such as the member 28 provided with an aperture 29 loosely fitting over the upper portion of the jacking screw 20, rests. Although ideally the surface 26 is spherically curved, it is obvious that except in precision applications of the device of the present invention a simple chamfering of the surface 26 will be sufficient to permit the limited universal movement of the member 28 with respect to the base 10, as hereinafter described.

Also loosely surrounding the jacking sleeve 20 is a second washer 30 presenting a flat surface 32 on the side thereof adapted to engage the member 28, but presenting a convex spherically curved surface 34 on the opposite side thereof co-oriented with the convex spherically curved surface 26 of the washer 24.

Means are provided disposed distally, with respect to the base 10, of the means for supporting the member 28 on the sleeve 20 for rotating the jacking sleeve 20 to thereby vary the spacing between the base 10 and the member 28. This means comprises a member 40 surrounding the upper end of the jacking sleeve 20 and provided with a hexagonal peripheral configuration adapting it for engagement by a wrench or the like. The end of the jacking screw 20 opposite its threaded portion is provided with a series of keys 42 interfitting with a corresponding series of key ways 44 formed in the member 40, this arrangement being such that rotation of the member 40 in either direction will effect corresponding rotation of the jacking sleeve 20, while permitting limited vertical movement of the member 40 with respect to the jacking sleeve 20.

Adjacent the convex spherically curved surface 34 of the washer 30, the surface 46 of the member 40 is correspondingly spherically curved so that upon tilting movement in any direction of the member 28 with respect to the base 10 within the limits imposed by the looseness of the fit between member 28 and washer 30 on the one hand and the jacking sleeve 20 on the other hand, the surface 26 may slide upon the surface 46. Preferably, the spherically curved surfaces 26, 34 and 46 are formed so that they constitute portions of a sphere having a common center.

Means are provided for releasably clamping between the washers 24 and 30 a member, such as the member 28, which is to be variably positioned with respect to the base 10. This means comprises a lock nut 50 having an hexagonal outer configuration corresponding to that of the member 40 and threaded upon threads 52 on the post 16. It will be seen that when the lock nut 50 is rotated to move it downwardly as viewed in FIGS. 2 and 3, it will compress the member 40, washer 30, member 28, and washer 24 against the shoulder 22 of the jacking sleeve 20 and prevent rotation of the member 40, thus retaining the jacking sleeve 20 in its current adjusted position. On the other hand, when the lock nut 50 is rotated to release the member 40 for rotation, its hexagonal faces may be aligned with those of the member 40 and the two may be rotated simultaneously by means such as a socket wrench to effect readjustment of the jacking sleeve 20, the pitch of the threads within the opening 12 and the threads 52 on the post 16 being made identical for this purpose.

Although the invention has been herein shown and described in what is conceived to be the most practical and preferred embodiment, it is recognized that departures may be made therefrom within the scope of the invention.

What is claimed is:

1. An adjustable support comprising:
   A. a base having an internally threaded opening;
   B. a post secured to said base and disposed concentrically with respect to said opening;
   C. an externally threaded jacking sleeve provided with a shoulder intermediate its ends surrounding said post and threaded into said opening;

D. support means comprising a first washer surrounding said jacking sleeve, engageable with said shoulder, and presenting a convex, spherically curved surface opposite said shoulder for supporting on said jacking sleeve a base member to be variably positioned with respect to said base;

E. a second washer loosely surrounding said jacking sleeve and presenting a convex, spherically curved surface coordinated with that of said first washer;

F. a member surrounding said jacking sleeve and presenting a concave, spherically curved surface engaging the convex, spherically curved surface of said second washer;

G. means releasably engageable with said member for clamping between said washers said base member to be variably positioned with respect to said base;

H. and means disposed distally of said supporting means with respect to said base for rotating said jacking sleeve.

2. An adjustable support according to claim 1 in which the convex spherically curved surfaces of said washers are curved with respect to a common center.

* * * * *